US008285514B2

(12) United States Patent
Anbari et al.

(10) Patent No.: US 8,285,514 B2
(45) Date of Patent: Oct. 9, 2012

(54) SENSOR FAULT DETECTION SYSTEMS AND METHODS THEREOF

(75) Inventors: Omar Anbari, Rochester, NY (US); Michael G. Thurston, Penfield, NY (US)

(73) Assignee: Rochester Institute of Technology, Rochester, NY (US)

( * ) Notice: Subject to any disclaimer, the term of this patent is extended or adjusted under 35 U.S.C. 154(b) by 506 days.

(21) Appl. No.: 12/077,779

(22) Filed: Mar. 21, 2008

(65) Prior Publication Data

US 2009/0240467 A1  Sep. 24, 2009

(51) Int. Cl.
G01C 25/00 (2006.01)
G06F 17/18 (2006.01)
G06F 19/00 (2011.01)

(52) U.S. Cl. .......... 702/179; 702/60; 702/116; 702/189; 702/191

(58) Field of Classification Search ............. 702/116, 702/60, 179, 189, 191
See application file for complete search history.

(56) References Cited

U.S. PATENT DOCUMENTS

| 5,729,145 | A | 3/1998 | Blades |
| 6,016,465 | A * | 1/2000 | Kelly ............................ 702/116 |
| 6,389,887 | B1 | 5/2002 | Dusserre-Telmon et al. |
| 6,804,600 | B1 * | 10/2004 | Uluyol et al. ................. 701/100 |
| 7,487,059 | B2 * | 2/2009 | Davis et al. .................. 702/116 |
| 7,634,382 | B2 * | 12/2009 | Andenna et al. ............. 702/179 |
| 7,729,876 | B2 * | 6/2010 | Milanovic et al. ............ 702/116 |
| 2003/0018928 | A1 * | 1/2003 | James et al. .................... 714/25 |
| 2005/0171647 | A1 | 8/2005 | Kunsman et al. |

OTHER PUBLICATIONS

International Search Report for International Patent Application No. PCT/US09/37687 (Jul. 10, 2009).

* cited by examiner

Primary Examiner — Janet Suglo
(74) Attorney, Agent, or Firm — LeClairRyan, a Professional Corporation

(57) ABSTRACT

A method, computer readable medium and system for detecting a sensor fault includes identifying one or more of a plurality of tools to use with at least one of a plurality of data acquisition systems based on data obtained from and at least one characteristic of the at least one of the data acquisition systems. The identified one or more tools are utilized on the obtained data to determine at least one confidence rating. An operational status for the at least one of the data acquisition systems is determined and provided based on at least the one determined confidence rating.

24 Claims, 5 Drawing Sheets

SENSOR FAULT DETECTION SYSTEMS AND METHODS THEREOF

The U.S. Government has a paid-up license in this invention and the right in limited circumstances to require the patent owner to license others on reasonable terms as provided for by the terms of Contract Nos. N00014-05-1-0708 and N00014-06-1-0998 awarded by the Office of Naval Research.

FIELD OF THE INVENTION

The present invention relates to fault detection systems and methods, and, more particularly, to sensor fault detection systems and methods thereof.

BACKGROUND

An asset health management system captures and analyzes data to provide diagnostic and prognostic information on the health of the assets in a system. By way of example only, one such system is disclosed in U.S. patent application Ser. No. 11/437,966, filed May 19, 2006, for, "Methods For Asset Health Management And Systems Thereof," claiming priority of U.S. Provisional Patent Application No. 60/682,627, filed May 19, 2005, which is herein incorporated by reference in its entirety. This diagnostic and prognostic information on the assets provides significant operational benefits as well as reducing life-cycle costs.

Unfortunately, when sensors in the asset health management system begin to have errors in capturing data, the accuracy of the resulting diagnostic and prognostic information can be substantially compromised. Additionally, because of the wide range of sensors which may be used, it is very difficult to determine when a sensor may have a fault. As a result, these erroneous readings and difficulties in identifying faulty sensors can result in unnecessary replacement of assets, downtime, and costs with the system.

SUMMARY OF THE INVENTION

A method for detecting a sensor fault in accordance with embodiments of the present invention includes identifying one or more of a plurality of tools to use with at least one of a plurality of data acquisition systems based on data obtained from and at least one characteristic of the at least one of the data acquisition systems. The identified one or more tools are utilized on the obtained data obtained to determine at least one confidence rating. An operational status for the at least one of the data acquisition systems is determined and provided based on at least the one determined confidence rating.

A computer readable medium having stored thereon instructions for detecting a sensor fault in accordance with other embodiments of the present invention includes identifying one or more of a plurality of tools to use with at least one of a plurality of data acquisition systems based on data obtained from and at least one characteristic of the at least one of the data acquisition systems. The identified one or more tools are utilized on the obtained data to determine at least one confidence rating. An operational status for the at least one of the data acquisition systems is determined and provided based on at least the one determined confidence rating.

A system that detects a sensor fault in accordance with other embodiments of the present invention includes an identification system, a confidence system, and an operational status system. The identification system identifies one or more of a plurality of tools to use with at least one of a plurality of data acquisition systems based on data obtained from and at least one characteristic of the at least one of the data acquisition systems. The confidence system utilizes the identified one or more tools on data obtained from the at least one of the data acquisition systems to determine at least one confidence rating. The operational status system determines and provides an operational status for the at least one of the data acquisition systems based on at least the one determined confidence rating.

The present invention provides an asset health management system and method that effectively detects errors in variety of different types of sensors in a system. As a result, the present invention helps to ensure the operational status and associated operational information provided by the asset health management system has a much higher degree of accuracy. This helps to minimize unnecessary replacement of assets, downtime, and costs with the system.

DETAILED DESCRIPTION

Figure 1:
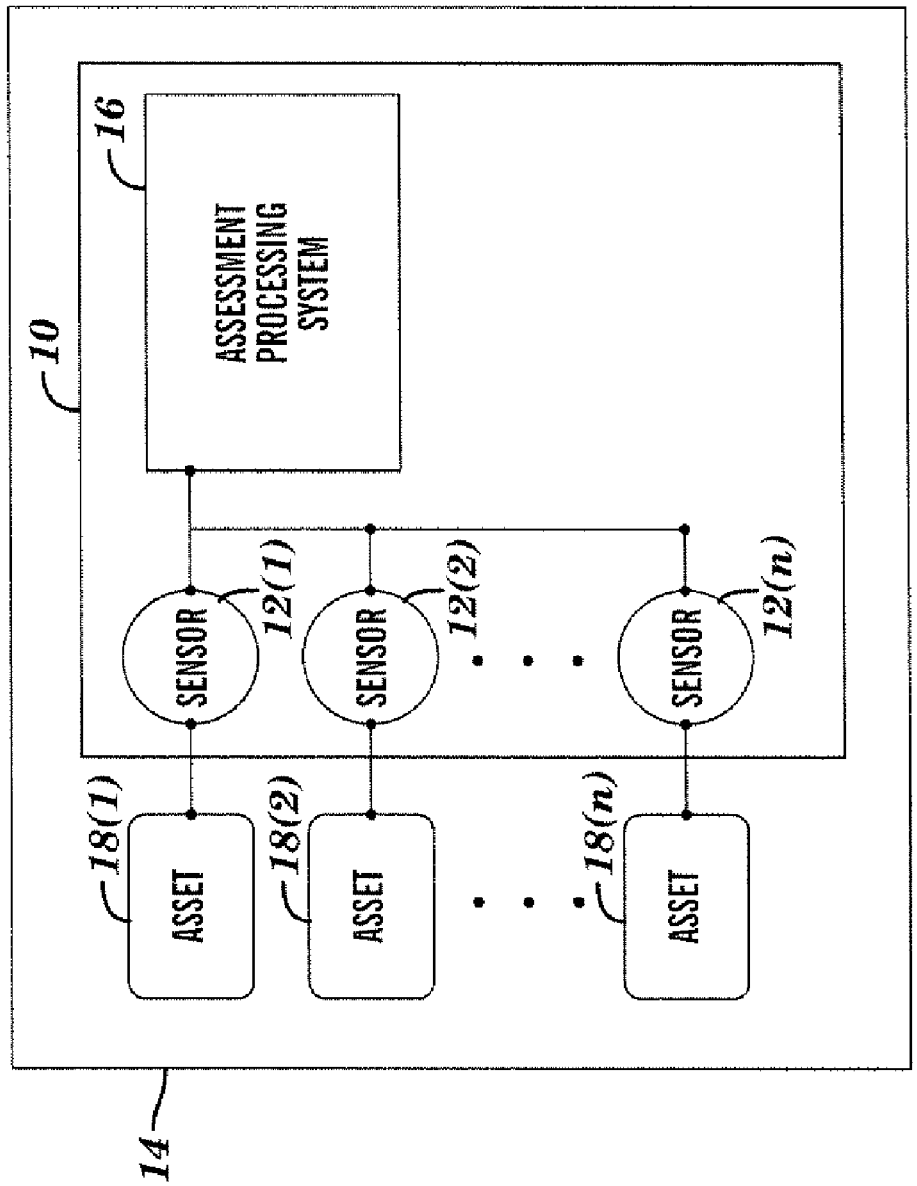
FIG. 1 is a block diagram of a sensor fault detection system in accordance with embodiments of the present invention in a monitored system.

An asset health management system 10 that detects faults in sensors 12(1)-12($n$) in accordance with embodiments of the present invention in a monitored system 14 is illustrated in FIG. 1. The asset health management system 10 includes the assessment processing system 16 and sensors 12(1)-12($n$), although the asset health management system 10 can include other types and numbers of systems, devices, and components connected in other manners. The present invention provides an asset health management system and method that effectively detects errors in variety of different types of sensors in a system.

Referring to FIG. 1, in this particular embodiment the monitored system 14 is a vehicle, although other types and numbers of systems, devices, and components could be monitored. The monitored system 14 includes a plurality of assets 18(1)-18($n$), such as a brake system, a fuel system, and a battery system, although other types and numbers of assets could be used.

A plurality of sensors 12(1)-12($n$), such as a temperature sensor, a pressure sensor, and a current sensor by way of example only, are each positioned adjacent one or more of the assets 18(1)-18($n$) in the monitored system 14, although other types and numbers of data acquisition systems, devices, and components could be used. The plurality of sensors 12(1)-12($n$) acquire operational data on each of the assets 18(1)-18($n$) in the monitored system 14 which is transmitted to the assessment processing system 16, although other types and amounts of data can be obtained in other manners and provided to the assessment processing system 16.

The assessment processing system 16 provides a diagnostic assessment of the assets 18(1)-18($n$) in the monitored system 14, although the assessment processing system 16 provide other types and numbers of assessments and functions. By way of example only, an health assessment processing system that conducts assessments is disclosed in U.S. patent application Ser. No. 11/437,966, filed May 19, 2006, for, "Methods For Asset Health Management And Systems Thereof," claiming priority of U.S. Provisional Patent Application No. 60/682,627, filed May 19, 2005, which is herein incorporated by reference in its entirety.

The assessment processing system 16 includes a central processing unit (CPU) or processor, a memory, user input device, display, and an interface system, and which are coupled together by a bus or other link, although the assessment processing system 16 can include other numbers and types of components, parts, devices, systems, and elements in other configurations. The processor in the assessment processing system 16 executes a program of stored instructions for one or more aspects of the present invention as described and illustrated herein, including methods for detecting a sensor fault, although the processor could execute other numbers and types of programmed instructions.

The memory in the assessment processing system 16 stores these programmed instructions for one or more aspects of the present invention as described and illustrated herein, including methods for detecting a sensor fault, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the assessment processing system 16.

The user input device in the assessment processing system 16 is used to input selections, such as a request for the operational status of one of the sensors 12(1)-12(n), although the user input device could be used to input other types of data and interact with other elements. The user input device can include a computer keyboard and a computer mouse, although other types and numbers of user input devices can be used. The display in the assessment processing system 16 is used to show data and information to the user, such as the operational status along with associated operational data for one of the sensors 12(1)-12(n) by way of example only. The display can include a computer display screen, such as a CRT or LCD screen, although other types and numbers of displays could be used.

The interface system in the assessment processing system 16 is used to operatively couple and communicate between the assessment processing system 16 and the sensors 12(1)-12(n) via a communications network, although other types and numbers of communication networks or systems with other types and numbers of connections and configurations can be used.

Although an embodiment of the assessment processing system 16 is described and illustrated herein, the assessment processing system 16 can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, the assessment processing system 16 may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for the assessment processing system 16 in any embodiment. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied in whole or in part as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
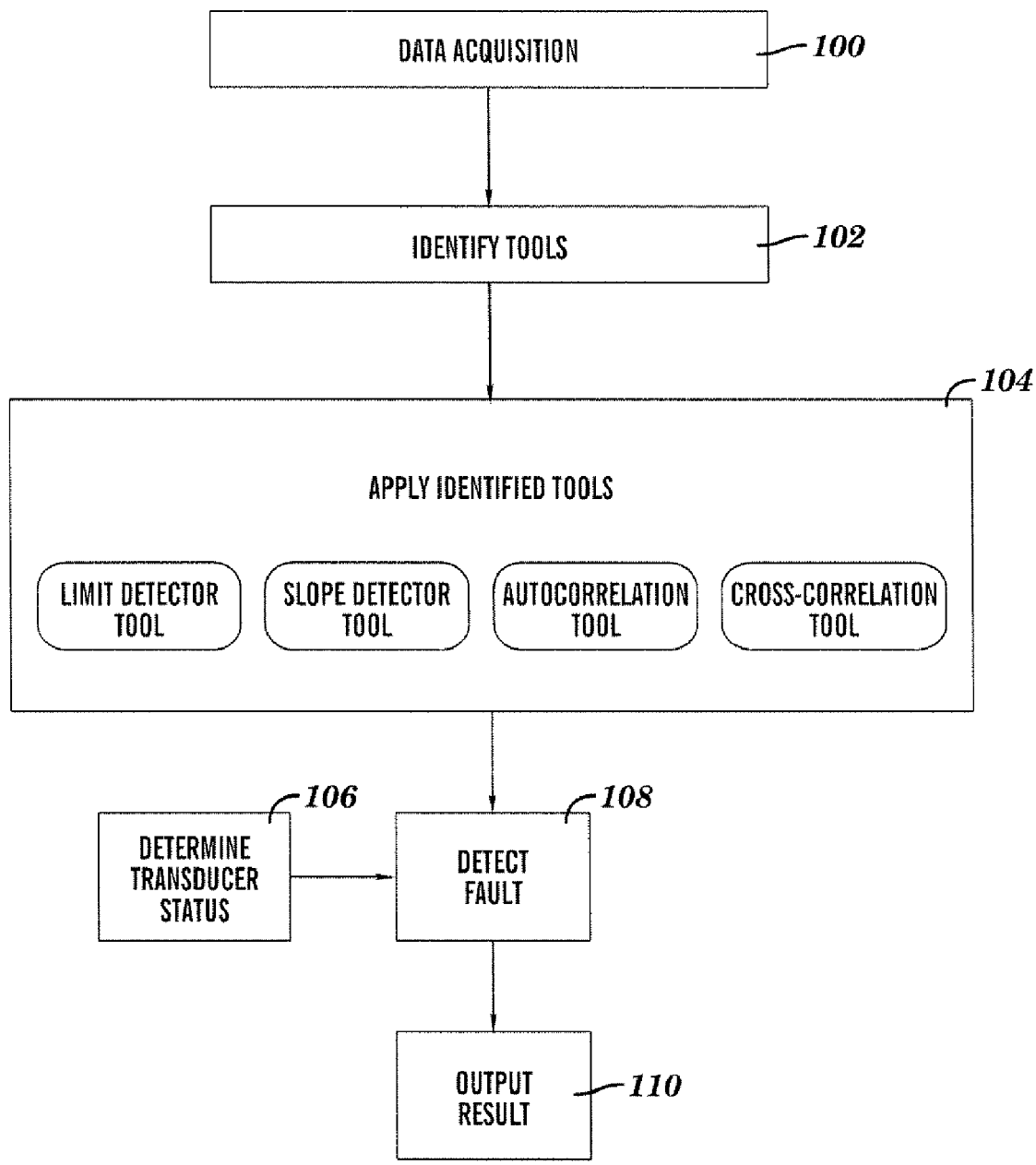
FIG. 2 is a flow chart of a method for detecting a sensor fault in accordance with embodiments of the present invention.

An example of the method for detecting a sensor fault in accordance with embodiments of the present invention will now be described with reference to FIGS. 1-2. In step 100, when the asset health management system 10 is engaged, the sensors 12(1)-12(n) monitor and acquire data on the assets 18(1)-18(n) in the monitored system 14, although other types and numbers of data acquisition systems, devices, and components could be used to monitor and acquire data from other numbers of assets. The data acquired by the sensors 12(1)-12(n) is transmitted to the assessment processing system 16, although the assessment processing system 16 could acquire the data in other manners.

In step 102, the assessment processing system 16 identifies which of a plurality of tools to use to detect a fault in each of the sensors 12(1)-12(n) based on the data obtained from, the characteristics of, and the relationship between the sensors 12(1)-12(n) in asset health management system 10, although other manners for identifying the one or more tools can be used. By way of example only, change rate obtained with a slope calculation tool is an important metric to consider when looking at temperature sensors, but is not relevant to a pressure or current sensors where much more variation is involved. In this particular embodiment, the plurality of tools the assessment processing system 16 uses comprises a limit detection tool, a slope calculation tool, an autocorrelation tool, and a cross-correlation tool, although other types and numbers of tools which are executed by other systems can be used.

In step 104, the assessment processing system 16 determines one or more of the limit confidence rating, the slope confidence rating, the autocorrelation rating, and the cross-correlation rating for each of the sensors 12(1)-12(n) based on the data obtained from, the characteristics of, and the relationship between the sensors 12(1)-12(n) in asset health management system 10, although other manners can be used for identifying the one or more tools. In this particular embodiment, these confidence ratings for each of the sensors 12(1)-12(n) are percentages that represent the level of confidence in the values being reported. By way of example only, a zero confidence rating is the lowest confidence rating and one-hundred percent is the highest confidence rating.

A description of how the assessment processing system 16 determines one or more of the limit confidence rating, slope confidence rating, autocorrelation rating, and cross-correlation rating with the corresponding limit detection tool, slope calculation tool, autocorrelation tool, and cross-correlation tool which are executed by the assessment processing system 16 are set forth below.

Limit Detection Tool:

For the sensors 12(1)-12(n) identified for the limit detection tool, the limit detection tool executed by the assessment processing system 16 obtains from memory in the assessment processing system 16 a physical range characterized by upper and lower boundaries for the obtained data, although other numbers and types of boundaries and other manners for obtaining the boundaries can be used. The limit detection tool compares the obtained data against the upper and lower boundaries and based on this comparison the assessment processing system 16 determines a limit confidence rating, although the limit confidence rating can be determined in other manners.

Slope Calculation Tool:

For the sensors 12(1)-12(n) identified for the slope calculation tool, the slope calculation tool executed by the assessment processing system 16 obtains from memory in the assessment processing system 16 a maximum change rate for the obtained data, although other manners for obtaining the maximum or other rate of change could be used. The slope calculation tool compares a rate of change of the obtained data against the obtained maximum change rate and based on this comparison the assessment processing system 16 determines a slope confidence rating, although the slope confidence rating can be determined in other manners.

Autocorrelation Tool:

For the sensors 12(1)-12(n) identified for the autocorrelation tool, the autocorrelation tool executed by the assessment processing system 16 obtains a maximum allowable difference between the obtained data and a time shifted version of the obtained data as a function of an amount of a time shift, although other manners for obtaining the maximum allowable difference could be used. The autocorrelation tool compares a difference between the obtained data and the time shifted version of the obtained data against the maximum allowable difference and based on this comparison the assessment processing system 16 determines an autocorrelation confidence rating, although the autocorrelation confidence rating can be determined in other manners.

Cross-Correlation Tool:

For the sensors 12(1)-12(n) identified for the cross-correlation tool, the cross-correlation tool executed by the assessment processing system 16 identifies data related to the obtained data. The autocorrelation tool also obtains a maximum allowable difference between the obtained data and the related data and based on this comparison the assessment processing system 16 determines a cross-correlation confidence rating based on the comparison.

In step 106, the assessment processing system 16 determines a transducer rating for each of the sensors 12(1)-12(n), although a transducer rating can be determined for other numbers of sensors. A variety of approaches can be used to determine a transducer rating or status. By way of example only, one particular approach is to follow the Failure Mode Indicators (FMI) defined by the SAE J1939 standards and map those sensor fault related FMIs to transducer rating or status states. In this particular embodiment, four transducer ratings or statuses are used: (1) 0: the transducer is not in a known bad state; (2) 35: the transducer is shorted to the high source; (3) 36: the transducer is shorted to the low source; and (4) 34: the transducer reports erratic data (usually due to an intermittent electrical connection).

In step 108, the assessment processing system 16 determines if a fault is detected for each of the sensors 12(1)-12(n) based on the determined transducer rating and one or more of the determined limit confidence rating, slope confidence rating, autocorrelation rating, and the cross-correlation rating, although a fault determination can be made for other numbers of sensors. These ratings are typically compared against benchmark values either stored in memory or passed as a parameter to the system. For instance, the transducer state assessment and the limit confidence rating are realized by comparing the sensor value to thresholds. The autocorrelation confidence rating is realized by comparing the average distance as calculated using Equation 1 set forth below of the autocorrelation coefficients to a predetermined "healthy" benchmark. In step 10, the fault detection determination for each of the sensors 12(1)-12(n) are shown on the display in the assessment processing system 16, although the fault detection determination can be out in other manners.

Example

To illustrate the operation of an embodiment of the present invention, an example of a monitor system 14 comprising a vehicle with a failed sensor 12(1) comprising a thermistor is presented. The probable failure mode in this case is an intermittent connection between the sensor and the data acquisition node causing abnormal variations in the output signal.

Figure 3:
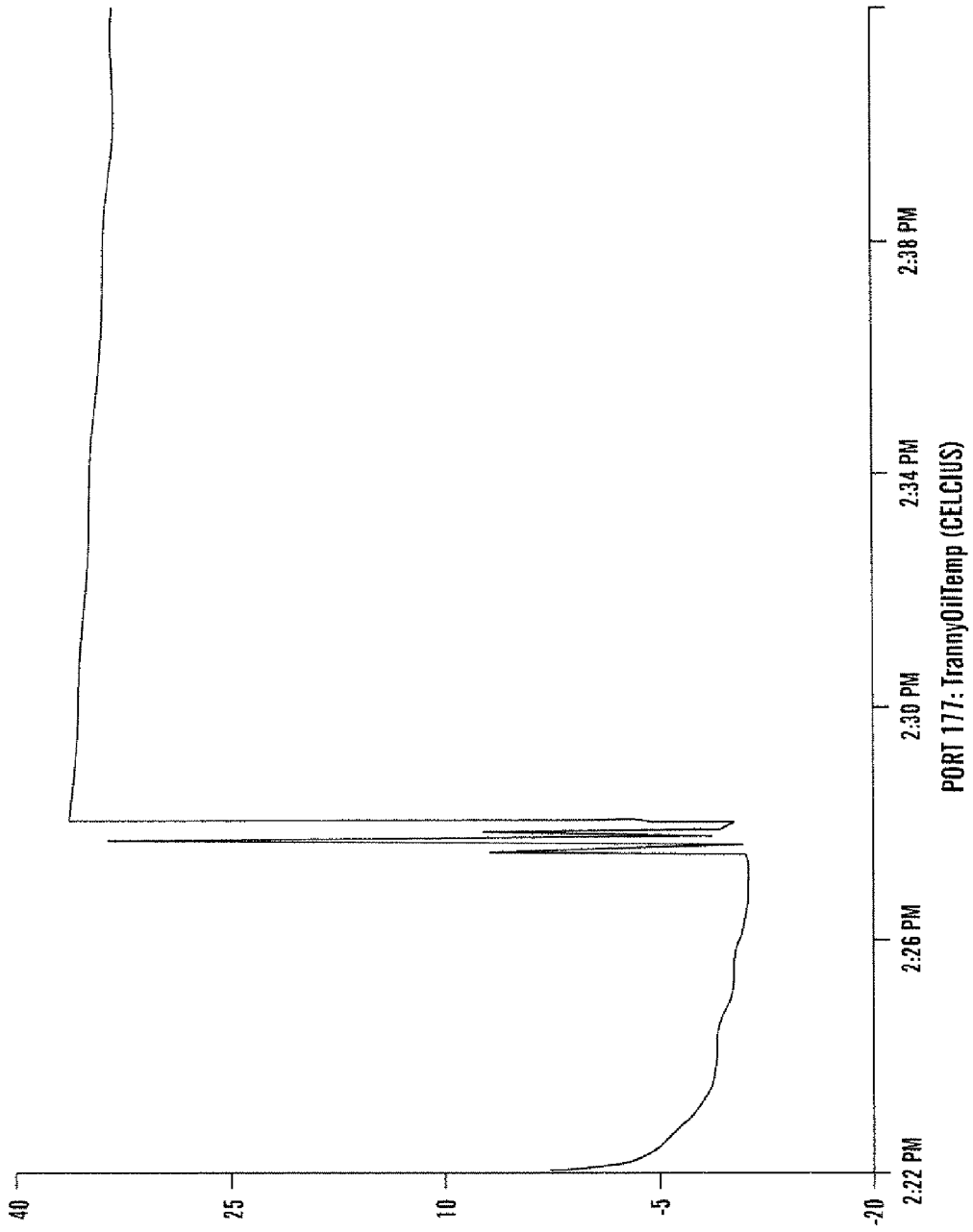
FIG. 3 is a graph of temperature readings of transmission oil over time taken by a thermistor.

Referring to FIG. 3, in the first four minutes, even though the level is much lower than it should be (the ambient temperature at that point was 17° C.), it is still within the sensor range and cannot, hence, be considered faulted based on the sensor value only. At 2:27 pm approximately, the variation in the signal becomes abnormal and the assessment processing system 16 detects it and drops the confidence (the grey color indicates a confidence lower than 50%).

Figure 4:
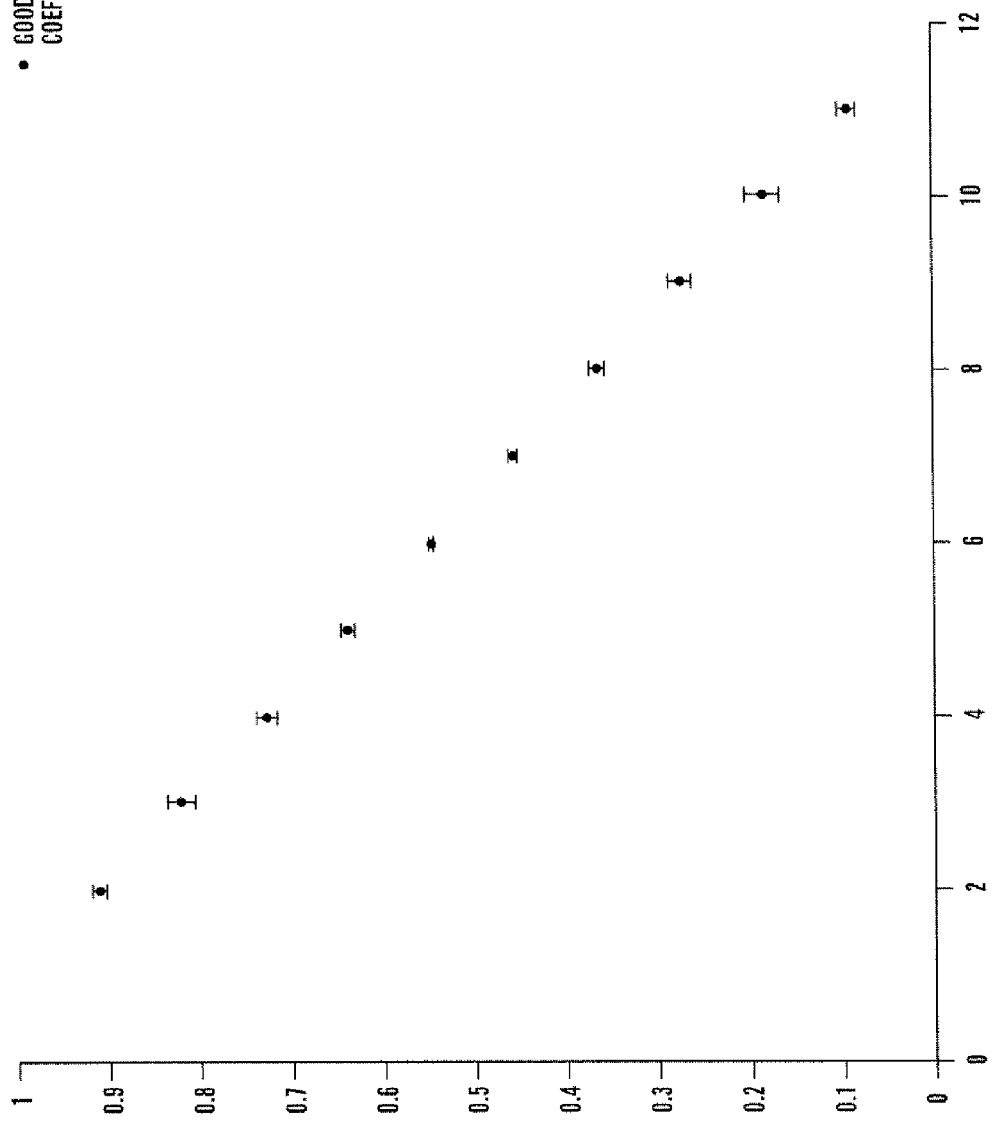
FIG. 4 is a graph of autocorrelation coefficients and their standard error calculated for a set of temperature data.

In this case, the autocorrelation coefficients norm was defined using a variety of good temperature data across different sensors. Referring to FIG. 4 the norm along with its maximum spread around the mean is illustrated.

The autocorrelation tool used by the assessment processing system 16 to determine whether one of the sensors 12(1)-12(n) failed is a distance to the norm defined as:

$$\sqrt{\sum_i (C_i^{Sensor} - C_i^{Norm})^2} \qquad \text{Equation 1}$$

Figure 5:
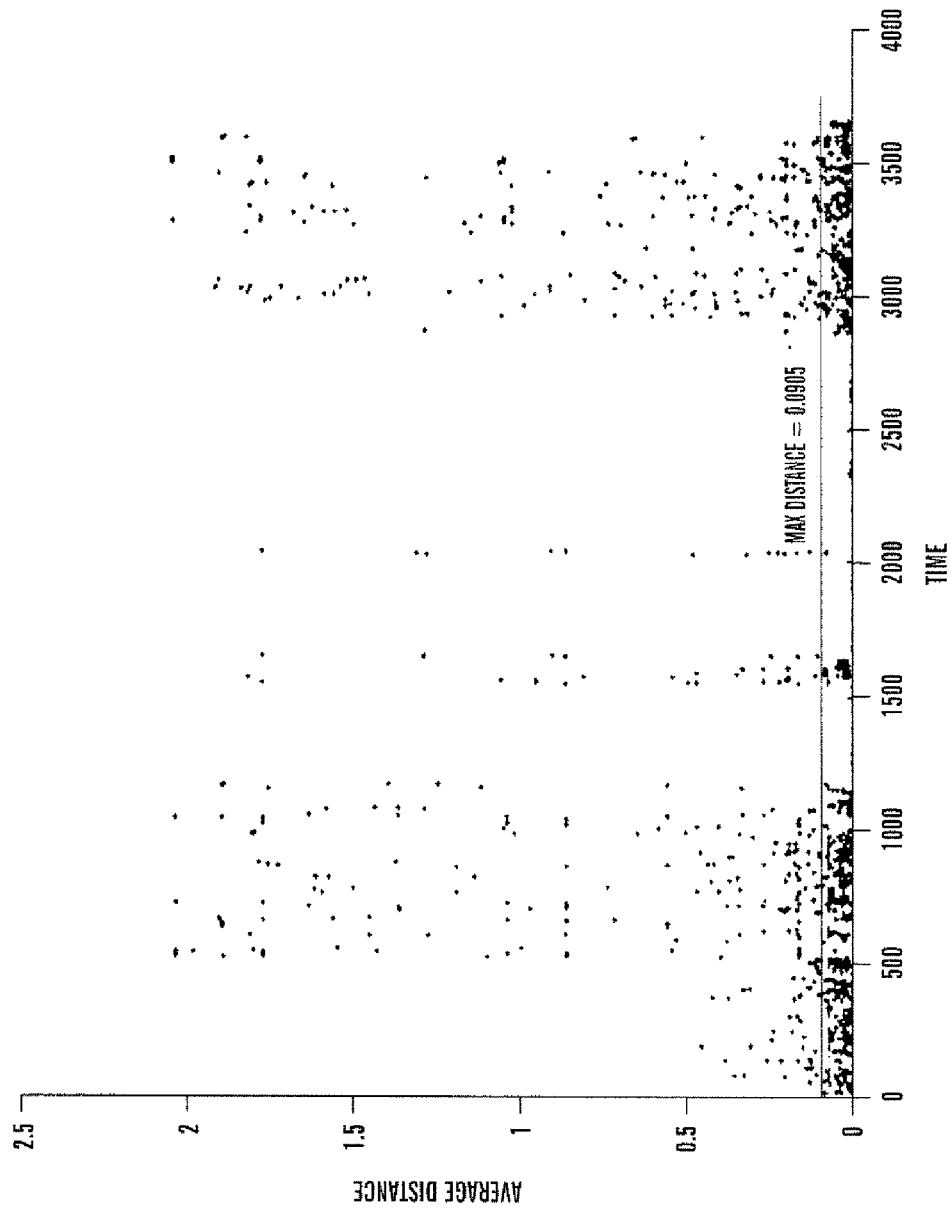
FIG. 5 is a graph of autocorrelation coefficients average distance to a benchmark for a failed sensor as calculated by Equation 1.

Next, data from the bad sensor is used to calculate the distance to the norm continuously and the distance is plotted against time as illustrated in FIG. 5. The horizontal line represents the threshold separating a good sensor from a faulty one. This figure shows all the opportunities the assessment processing system 16 has to detect that this particular sensor is failed based solely on autocorrelation.

Accordingly, as illustrated and described herein the present invention effectively detects errors in variety of different types of sensors in a system. As a result, the present invention helps to ensure the operational status and associated operational information provided by the asset health management system has a much higher degree of accuracy. This helps to minimize unnecessary replacement of assets, downtime, and costs with the system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for detecting a sensor fault, the method comprising:
   identifying with an assessment processing device one or more of a plurality of tools to use with at least one of a plurality of data acquisition systems based on data obtained from, at least one characteristic of the at least one of the plurality of data acquisition systems, wherein the plurality of tools comprise at least a cross-correlation tool; wherein utilizing the cross-correlation tool comprises:
      identifying with the assessment processing device baseline data;
      determining with the assessment processing device which portion of data related to the obtained data is used for the baseline data;
   utilizing with the assessment processing device the identified one or more tools on the obtained data to determine at least one confidence rating, wherein the at least one confidence rating is determined based on the data obtained from the relationship between and the at least one characteristic of the plurality of data acquisition systems; and
   determining and providing with the assessment processing device an operational status for the at least one of the plurality data acquisition systems based on at least the one determined confidence rating.

2. The method as set forth in claim 1 wherein the plurality of tools comprise two or more of a limit detection tool, a slope calculation tool, and an auto correlation tool.

3. The method as set forth in claim 2 wherein one of the two or more tools comprises the limit detection tool and wherein the utilizing the limit detection tool further comprises:
   obtaining with the assessment processing device at least one of an upper boundary and a lower boundary for the obtained data from the at least one of the data acquisition systems;
   comparing with the assessment processing device the obtained data against at least one of the upper boundary and the lower boundary; and
   determining with the assessment processing device a limit confidence rating based on the comparison.

4. The method as set forth in claim 2 wherein one of the two or more tools comprises the slope calculation tool and wherein the utilizing the slope calculation tool further comprises:
   obtaining with the assessment processing device at least a maximum change rate for the obtained data from the at least one of the data acquisition systems;
   comparing with the assessment processing device a rate of change of the obtained data against the obtained maximum change rate; and
   determining with the assessment processing device a slope confidence rating based on the comparison.

5. The method as set forth in claim 2 wherein one of the two or more tools comprises the autocorrelation tool and wherein the utilizing the autocorrelation tool further comprises:
   obtaining with the assessment processing device a maximum allowable difference between the obtained data and a time shifted version of the obtained data as a function of an amount of a time shift;
   comparing with the assessment processing device a difference between the obtained data and the time shifted version of the obtained data against the maximum allowable difference; and
   determining with the assessment processing device an autocorrelation confidence rating based on the comparison.

6. The method as set forth in claim 1 wherein the utilizing the cross-correlation tool further comprises:
   obtaining with the assessment processing device a maximum allowable difference between the obtained data and the related data;
   comparing with the assessment processing device a difference between the obtained data and the related data against the maximum allowable difference; and
   determining with the assessment processing device a cross-correlation confidence rating based on the comparison.

7. The method as set forth in claim 1 further comprising determining with the assessment processing device a transducer rating for the at least one of the data acquisition systems, wherein the determining and providing the operational status is further based on the determined transducer rating.

8. The method as set forth in claim 1 further comprising measuring with the assessment processing device noise associated with obtained data from the at least one of the data acquisition systems, wherein the determining and providing the operational status is further based on the measured noise.

9. A non-transitory computer readable medium having stored thereon instructions for detecting a sensor fault comprising machine executable code which when executed by at least one processor, causes the processor to perform steps comprising:
   identifying one or more of a plurality of tools to use with at least one of a plurality of data acquisition systems based on data obtained from and at least one characteristic of the at least one of the plurality of data acquisition systems, wherein the plurality of tools comprise at least a cross-correlation tool; wherein utilizing the cross-correlation tool comprises:
      identifying baseline data;
      determining which portion of data related to the obtained data is used for the baseline data;
   utilizing the identified one or more tools on the obtained data to determine at least one confidence rating, wherein the at least one confidence rating is determined based on the data obtained from the relationship between and the at least one characteristic of the plurality of data acquisition systems; and
   determining and providing an operational status for the at least one of the plurality data acquisition systems based on at least the one determined confidence rating.

10. The medium as set forth in claim 9 wherein the plurality of tools comprise two or more of a limit detection tool, a slope calculation tool, and an autocorrelation tool.

11. The medium as set forth in claim 10 wherein one of the two or more tools comprises the limit detection tool and wherein the utilizing the limit detection tool further comprises:
  obtaining at least one of an upper boundary and a lower boundary for the obtained data from the at least one of the data acquisition systems;
  comparing the obtained data against at least one of the upper boundary and the lower boundary; and
  determining a limit confidence rating based on the comparison.

12. The medium as set forth in claim 10 wherein one of the two or more tools comprises the slope calculation tool and wherein the utilizing the slope calculation tool further comprises:
  obtaining at least a maximum change rate for the obtained data from the at least one of the data acquisition systems;
  comparing a rate of change of the obtained data against the obtained maximum change rate; and
  determining a slope confidence rating based on the comparison.

13. The medium as set forth in claim 10 wherein one of the two or more tools comprises the autocorrelation tool and wherein the utilizing the autocorrelation tool further comprises:
  obtaining a maximum allowable difference between the obtained data and a time shifted version of the obtained data as a function of an amount of a time shift;
  comparing a difference between the obtained data and the time shifted version of the obtained data against the maximum allowable difference; and
  determining an autocorrelation confidence rating based on the comparison.

14. The medium as set forth in claim 9 wherein the utilizing the cross-correlation tool further comprises:
  obtaining a maximum allowable difference between the obtained data and the related data;
  comparing a difference between the obtained data and the related data against the maximum allowable difference; and
  determining a cross-correlation confidence rating based on the comparison.

15. The medium as set forth in claim 9 further comprising determining a transducer rating for the at least one of the data acquisition systems, wherein the determining and providing the operational status is further based on the determined transducer rating.

16. The medium as set forth in claim 9 further comprising measuring noise associated with obtained data from the at least one of the data acquisition systems, wherein the determining and providing the operational status is further based on the measured noise.

17. A sensor fault detection apparatus comprising:
  an identification system in an assessment processing device that identifies one or more of a plurality of tools to use with at least one of a plurality of data acquisition systems based on data obtained from and at least one characteristic of the at least one of the plurality of data acquisition systems, wherein the plurality of tools comprise at least a cross-correlation tool; wherein utilizing the cross-correlation tool comprises:
    a data search system in the assessment processing device that identifies baseline data;
    a boundary system in the assessment processing device that determines which portion of data related to the obtained data is used for the baseline data;
  a confidence system in the assessment processing device that utilizes the identified one or more tools on the obtained data to determine at least one confidence rating, wherein the at least one confidence rating is determined based on the data obtained from the relationship between and the at least one characteristic of the plurality of data acquisition systems; and
  an operational status system in the assessment processing device that determines and provides an operational status for the at least one of the data acquisition systems based on at least the one determined confidence rating.

18. The apparatus as set forth in claim 17 wherein the plurality of tools comprise two or more of a limit detection tool, a slope calculation tool, and an autocorrelation tool.

19. The apparatus as set forth in claim 18 wherein one of the two or more tools comprises the limit detection tool and wherein the limit detection tool further comprises:
  a boundary system in the assessment processing device that obtains at least one of an upper boundary and a lower boundary for the obtained date from the at least one of the data acquisition systems; and
  a comparison system in the assessment processing device that compares the obtained data against at least one of the upper boundary and the lower boundary;
  wherein the confidence system determines a limit confidence rating based on the comparison.

20. The apparatus as set forth in claim 18 wherein one of the two or more tools comprises the slope calculation tool and wherein the slope calculation tool further comprises:
  a boundary system in the assessment processing device that obtains at least a maximum change rate for the obtained data from the at least one of the data acquisition systems; and
  a comparison system in the assessment processing device that compares a rate of change of the obtained data against the obtained maximum change rate;
  wherein the confidence system determines a slope confidence rating based on the comparison.

21. The apparatus as set forth in claim 18 wherein one of the two or more tools comprises the autocorrelation tool and wherein the autocorrelation tool further comprises:
  a boundary system in the assessment processing device that obtains a maximum allowable difference between the obtained data and a time shifted version of the obtained data as a function of an amount of a time shift; and
  a comparison system in the assessment processing device that compares a difference between the obtained data and the time shifted version of the obtained data against the maximum allowable difference; and
  wherein the confidence system determines an autocorrelation confidence rating based on the comparison.

22. The apparatus as set forth in claim 17 wherein the utilizing the cross-correlation tool further comprises:
  a boundary system in the assessment processing device that obtains a maximum allowable difference between the obtained data and the related data; and
  a comparison system in the assessment processing device that compares a difference between the obtained data and the related data against the maximum allowable difference;
  wherein the confidence system determines a cross-correlation confidence rating based on the comparison.

23. The apparatus as set forth in claim 17 further comprising a transducer rating system in the assessment processing device that determines a transducer rating for the at least one of the data acquisition systems, wherein the operational status system determines and provides the operational status further based on the determined transducer rating.

24. The apparatus as set forth in claim 17 further comprising a noise measurement system in the assessment processing device that measures noise associated with obtained data from the at least one of the data acquisition systems, wherein the operational status system determines and provides the operational status further based on the measured noise.

* * * * *